United States Patent
Kim et al.

(10) Patent No.: US 12,512,533 B2
(45) Date of Patent: Dec. 30, 2025

(54) BATTERY MODULE HAVING STRUCTURE CAPABLE OF RAPID COOLING, AND ESS COMPRISING SAME

(71) Applicant: LG ENERGY SOLUTION, LTD., Seoul (KR)

(72) Inventors: Seung-Hyun Kim, Daejeon (KR); Ji-Won Jeong, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 565 days.

(21) Appl. No.: 17/625,984

(22) PCT Filed: Jan. 15, 2021

(86) PCT No.: PCT/KR2021/000630
§ 371 (c)(1),
(2) Date: Jan. 10, 2022

(87) PCT Pub. No.: WO2021/172757
PCT Pub. Date: Sep. 2, 2021

(65) Prior Publication Data
US 2022/0278392 A1    Sep. 1, 2022

(30) Foreign Application Priority Data
Feb. 27, 2020    (KR) .................. 10-2020-0024459

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 50/143* (2021.01); *H01M 50/24* (2021.01); *H01M 50/507* (2021.01)

(58) Field of Classification Search
CPC ........... H01M 10/6568; H01M 10/613; H01M 50/143; H01M 50/24; H01M 50/507;
(Continued)

(56) References Cited

U.S. PATENT DOCUMENTS

2010/0236797 A1*  9/2010  VanEerden ............ A62C 37/12
                                                      169/57
2017/0043194 A1   2/2017  Ling
(Continued)

FOREIGN PATENT DOCUMENTS

CN     106684499 A    5/2017
CN     206388817 U    8/2017
(Continued)

OTHER PUBLICATIONS

Machine translation of JP-2015-153616-A, published on Aug. 24, 2015.
(Continued)

*Primary Examiner* — Cynthia K Walls
(74) *Attorney, Agent, or Firm* — Birch, Stewart, Kolasch & Birch, LLP

(57) ABSTRACT

A battery module includes a plurality of battery cells; a module housing configured to accommodate a cell stack including the plurality of battery cells; and a sprinkler provided through the module housing at one side of the cell stack in a stacking direction, and the sprinkler includes a coupler positioned at an outer side of the module housing and connected to a supply tube that supplies a cooling fluid; a sprinkler head positioned at an inner side of the module housing and connected to the coupler; and an insulation
(Continued)

cover including a fixing portion fixed to the module housing and a cover portion fixed to the fixing portion by a bonding layer to cover the sprinkler head and configured to be separated from the fixing portion over a reference temperature as a bonding force of the bonding layer is decreased or lost.

20 Claims, 8 Drawing Sheets

(51) Int. Cl.
  *H01M 50/143* (2021.01)
  *H01M 50/24* (2021.01)
  *H01M 50/507* (2021.01)
(58) Field of Classification Search
  CPC ........... H01M 10/627; H01M 10/6567; H01M 50/244; H01M 50/251; H01M 50/258; H01M 50/502; H01M 2200/10; H01M 2220/10; Y02E 60/10; A62C 37/14; A62C 3/16; A62C 2/06; A62C 35/60; A62C 35/68; A62C 2/065; A62C 37/12
  See application file for complete search history.

(56) References Cited

U.S. PATENT DOCUMENTS

2018/0282980 A1* 10/2018 Walcome ................ E03B 9/025
2019/0001838 A1*  1/2019 Choi ........................ B60L 50/60

FOREIGN PATENT DOCUMENTS

| | | |
|---|---|---|
| EP | 3968442 A1 | 3/2022 |
| JP | 5-31207 A | 2/1993 |
| JP | 2009-523518 A | 6/2009 |
| JP | 2011-254906 A | 12/2011 |
| JP | 2014-36780 A | 2/2014 |
| JP | 2014-90782 A | 5/2014 |
| JP | 2015-153616 A | 8/2015 |
| JP | 2015-230756 A | 12/2015 |
| JP | 2016-2419 A | 1/2016 |
| JP | 2018-530886 A | 10/2018 |
| JP | 2019-75191 A | 5/2019 |
| JP | 2019-92780 A | 6/2019 |
| KP | 10-1647427 B1 | 8/2016 |
| KR | 20-0394311 Y1 | 8/2005 |
| KR | 10-2021072 B1 | 11/2019 |
| WO | WO 02/15981 A1 | 2/2002 |
| WO | WO 2019/177275 A | 9/2019 |

OTHER PUBLICATIONS

International Search Report for PCT/KR2021/000630 mailed on Apr. 29, 2021.
Extended European Search Report for European Application No. 21760150.9 dated Nov. 8, 2023.

* cited by examiner

BATTERY MODULE HAVING STRUCTURE CAPABLE OF RAPID COOLING, AND ESS COMPRISING SAME

TECHNICAL FIELD

The present disclosure relates to a battery module having a structure allowing rapid cooling and an ESS including the battery module. More specifically, the present disclosure relates to a battery module having a structure capable of rapidly removing an insulation cover provided to a sprinkler so that a cooling fluid for fire extinguishing and cooling is smoothly injected when the sprinkler is operated since a venting gas is leaked inside the battery module, and an ESS including the battery module.

The present application claims priority to Korean Patent Application No. 10-2020-0024459 filed on Feb. 27, 2020 in the Republic of Korea, the disclosures of which are incorporated herein by reference.

BACKGROUND ART

Currently commercialized secondary batteries include nickel cadmium batteries, nickel hydride batteries, nickel zinc batteries, and lithium secondary batteries. Among them, lithium secondary batteries are in the spotlight since they have little memory effect compared to nickel-based secondary batteries to secure free charging and discharging and also have a very low discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery pouch exterior, for sealing and storing the electrode assembly together with an electrolyte.

Recently, secondary batteries are widely used not only in small devices such as portable electronic devices, but also in medium-sized or large-sized devices such as vehicles and energy storage systems. When used in such a medium-sized or large-sized device, a large number of secondary batteries are electrically connected to increase capacity and output. In particular, pouch-type secondary batteries are widely used in such medium-sized devices since they may be stacked easily.

Meanwhile, as the need for a large-capacity structure is increasing recently along with utilization as an energy storage source, the demand for a battery module including a plurality of secondary batteries electrically connected in series and/or in parallel is increasing.

In addition, the battery module generally has an outer housing made of a metal material to protect or store a plurality of secondary batteries from an external shock. Meanwhile, the demand for high-capacity battery modules is increasing recently.

In the case of such a high-capacity battery module, if the temperature inside the battery module increases since venting occurs in at least some of the internal battery cells, great damage may be generated. That is, if a thermal runaway phenomenon occurs due to an increase in internal temperature, the temperature of the high-capacity battery module may increase rapidly, and accordingly a large-scale ignition and/or explosion may occur.

Accordingly, it is necessary to develop a rapid and complete fire extinguishing technology to take immediate measures when an abnormal temperature rise occurs due to venting occurring in a battery cell inside the battery module.

DISCLOSURE

Technical Problem

The present disclosure is designed to solve the problems of the related art, and therefore the present disclosure is directed to rapidly removing an insulation cover provided to a sprinkler so that the insulation cover does not disturb the injection of a cooling fluid when a high-temperature venting gas is leaked inside a battery module.

However, the technical problem to be solved by the present disclosure is not limited to the above, and other objects not mentioned herein will be understood from the following description by those skilled in the art.

Technical Solution

In one aspect of the present disclosure, there is provided a battery module having a cell stack including a plurality of battery cells; a module housing configured to accommodate the cell stack; and a sprinkler provided through the module housing at one side of the cell stack in a stacking direction, wherein the sprinkler includes: a coupler configured to be positioned at an outer side of the module housing and connected to a supply tube that supplies a cooling fluid; a sprinkler head positioned at an inner side of the module housing and connected to the coupler; and an insulation cover including a fixing portion fixed to the module housing and a cover portion fixed to the fixing portion by a bonding layer to cover the sprinkler head and configured to be separated from the fixing portion when a temperature in the module housing exceeds a reference temperature as a bonding force of the bonding layer is decreased or lost.

The module housing may include a pair of base covers configured to cover a lower surface and an upper surface of the cell stack, respectively; a pair of side covers configured to cover side surfaces of the cell stack; a front cover configured to cover a front surface of the cell stack; and a rear cover configured to cover a rear surface of the cell stack.

The battery module may comprise a pair of bus bar frames coupled to a first side and a second side of the cell stack in a width direction, respectively.

The sprinkler may be provided through the rear cover and positioned in an empty space formed between a bus bar frame of the pair of bus bar frames and a side cover of the pair of side covers.

The sprinkler head may include a glass bulb provided to block a cooling fluid injection hole of the coupler and configured to be ruptured to open the cooling fluid injection hole when the temperature inside the battery module increases over the reference temperature or when a flow rate of gas inside the battery module increases over a reference value and a holding bracket configured to fix the glass bulb while surrounding the glass bulb.

The insulation cover may include a first region facing the cell stack and the bus bar frame and a second region other than the first region, and the first region may be formed such that a closed area is greater than an opened area, and the second region may be formed such that an opened area is greater than a closed area.

The first region may have at least one cover hole for injecting the cooling fluid.

The battery module may comprise an air inlet formed through the front cover; an air outlet formed through the rear cover; and an expansion pad disposed at an inner side of the air inlet and the air outlet and configured to at least partially close the air inlet and the air outlet by expanding when contacting the cooling fluid introduced into the battery module.

The expansion pad may be attached onto an inner surface of the module housing.

The expansion pad may be at least partially inserted into an accommodation groove formed at an inner surface of the module housing.

The battery module may comprise mesh plates respectively disposed at both sides of the expansion pad to guide an expanding movement of the expansion pad.

The air inlet and the air outlet may be respectively formed at locations corresponding to an empty space formed between a bus bar frame of the pair of bus bar frames and a side cover of the pair of side covers.

The cover portion may be hinged to the fixing portion and be opened by rotating downward of the sprinkler head.

Meanwhile, an energy storage system (ESS) according to an embodiment of the present disclosure comprises a plurality of battery modules according to the present disclosure.

Advantageous Effects

According to an embodiment of the present disclosure, when a venting gas is leaked inside a battery module, an insulation cover provided to a sprinkler is removed rapidly so that the insulation cover does not disturb the injection of a cooling fluid, thereby allowing rapid cooling and fire extinguishing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall structure of a battery module 1 according to an embodiment of the present disclosure will be described with reference to FIGS. 1 to 3.

Figure 1:
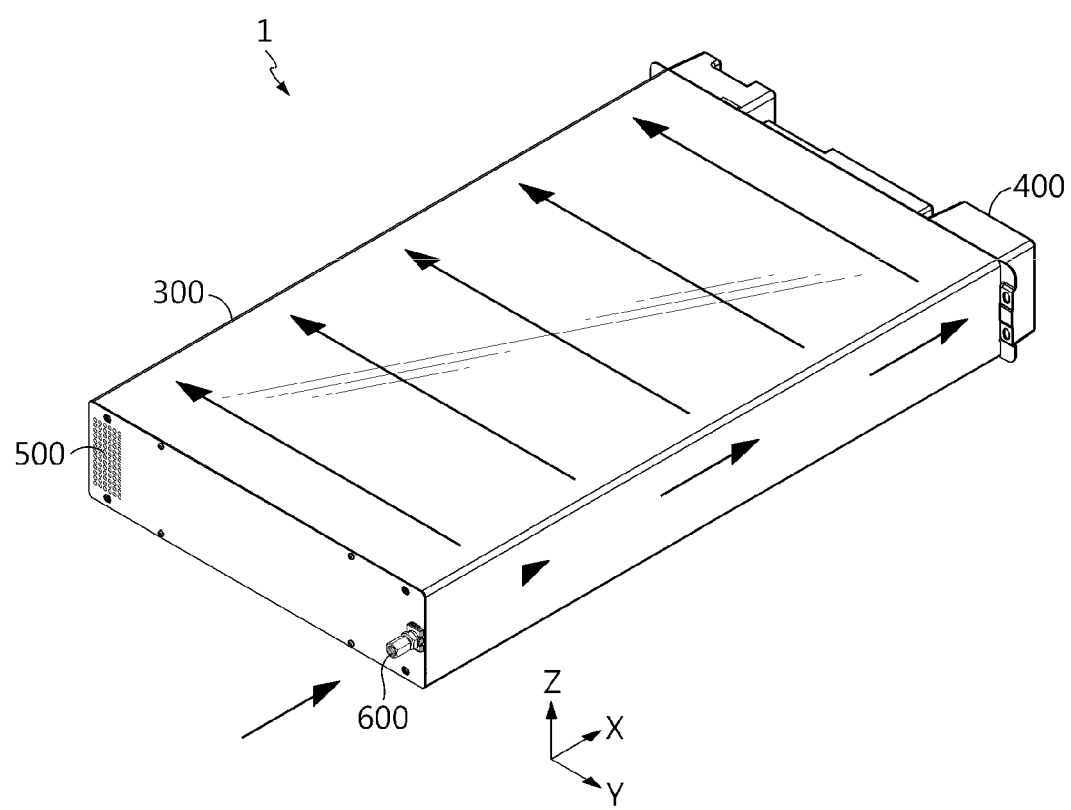
FIGS. 1 and 2 are perspective views showing a battery module according to an embodiment of the present disclosure.
Figure 2:
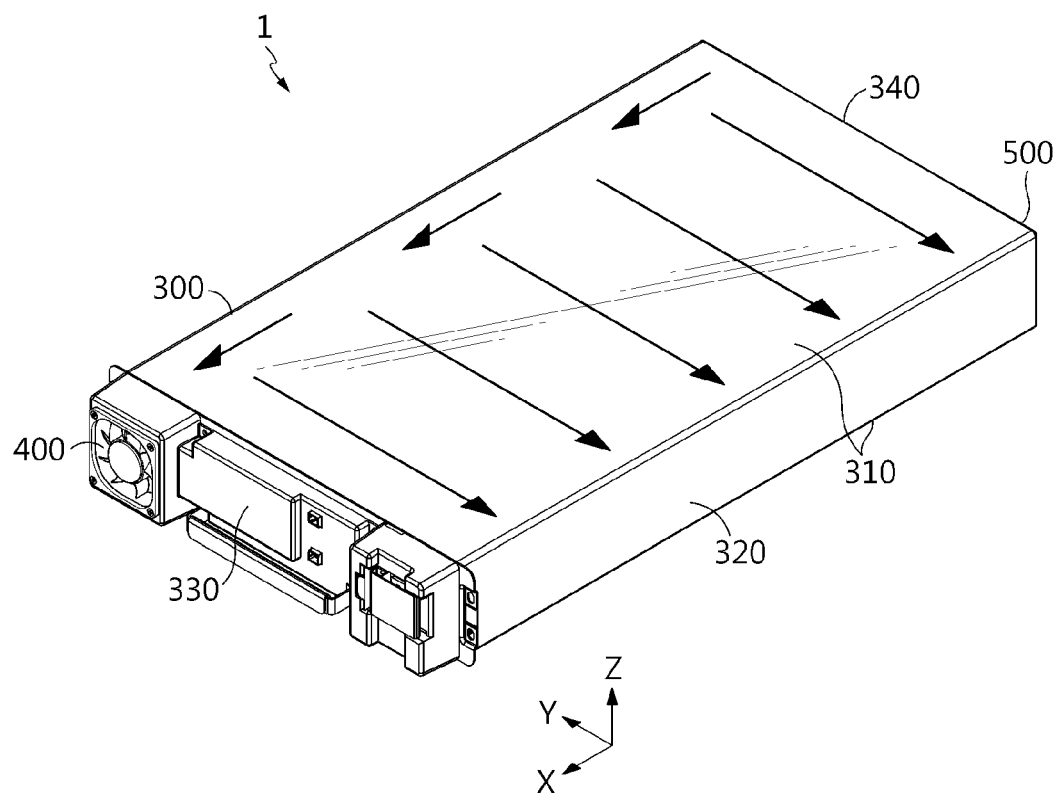
Figure 3:
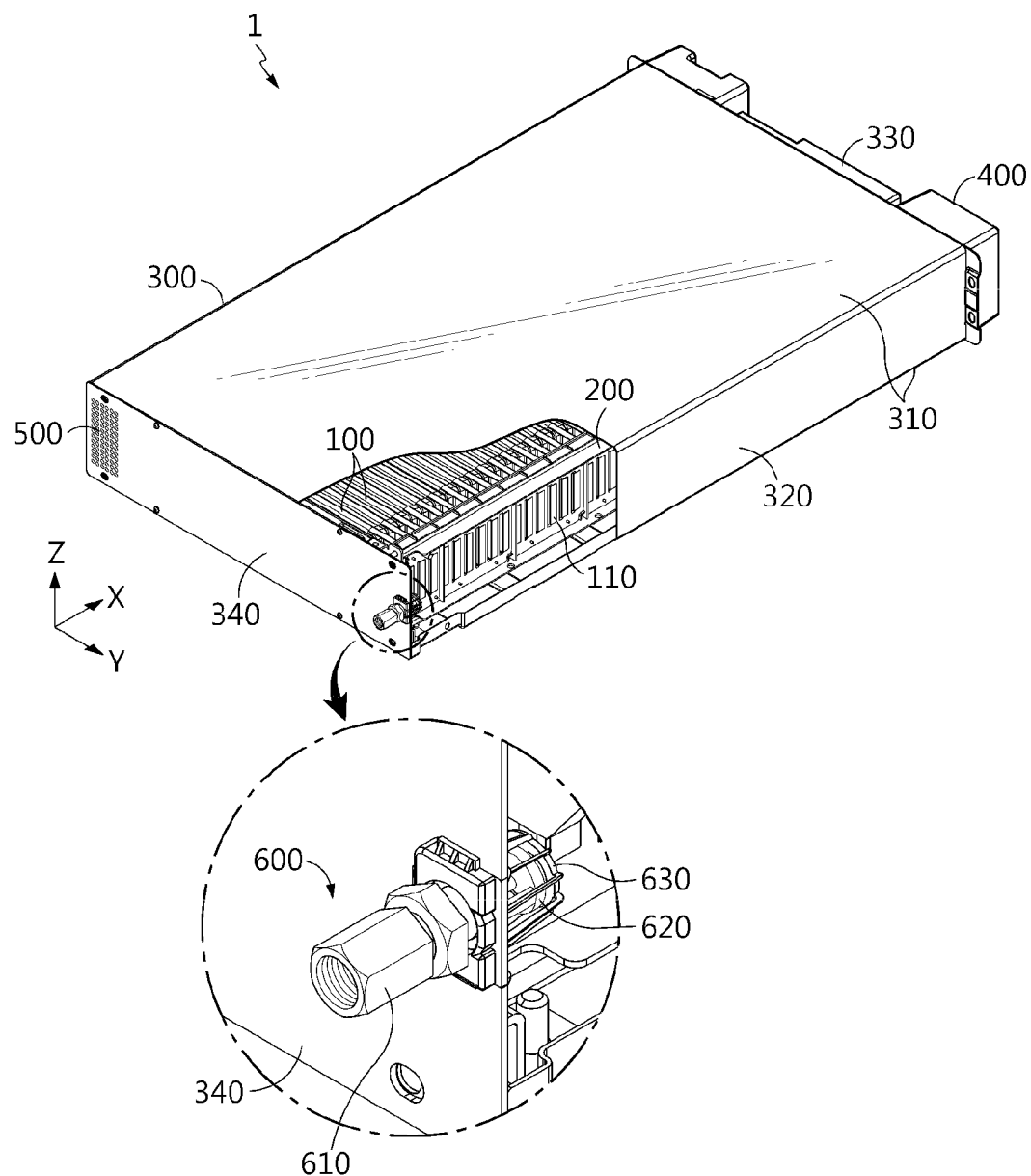
FIG. 3 is a diagram showing an inner structure of the battery module depicted in FIGS. 1 and 2.

Referring to FIGS. 1 to 3, the battery module 1 according to an embodiment of the present disclosure includes a plurality of battery cells 100, a bus bar frame 200, a module housing 300, an air inlet 400, an air outlet 500 and a sprinkler 600.

The battery cell 100 is provided in plural, and the plurality of battery cells 100 are stacked to form one cell stack. The battery cell 100 may employ, for example, a pouch-type battery cell. The battery cell 100 includes a pair of electrode leads 110 respectively drawn out at both sides in a longitudinal direction (a direction parallel to the Y axis shown in the figure). Meanwhile, although not shown in the drawings, the cell stack may further include a buffer pad provided between the battery cells 100 adjacent to each other, if necessary. When the cell stack is accommodated in the module housing 300, the buffer pad allows the cell stack to be accommodated in a compressed state, thereby limiting movement caused by external shocks and suppressing a swelling phenomenon of the battery cells 100.

The bus bar frame 200 is provided in a pair, and the pair of bus bar frames 200 cover one side and the other side of the cell stack in a width direction (a direction parallel to the Y axis in the figure). The electrode lead 110 of the battery cell 100 is drawn through a slit formed at the bus bar frame 200, and is bent and fixed by welding or the like onto a bus bar provided to the bus bar frame 200. That is, the plurality of battery cells 100 may be electrically connected by the bus bar provided to the bus bar frame 200.

The module housing 300 has a substantially rectangular parallelepiped shape, and accommodates the cell stack therein. The module housing 300 includes a pair of base covers 310 respectively configured to cover a lower surface and an upper surface of the cell stack (surfaces parallel to the X-Y plane), a pair of side covers 320 respectively configured to cover side surfaces of the cell stack (surfaces parallel to the X-Z plane), a front cover 330 configured to cover a front surface of the cell stack (a surface parallel to the Y-Z plane), and a rear cover 340 configured to cover a rear surface of the cell stack (a surface parallel to the Y-Z plane).

The air inlet 400 is formed at one side of the cell stack in the stacking direction (a direction parallel to the X axis), namely at one side of the battery module 1 in the longitudinal direction and has a hole shape formed through the front cover 330. The air outlet 500 is formed at the other side of the cell stack in the stacking direction, namely at the other side of the battery module 1 in the longitudinal direction and is has a hole shape formed through the rear cover 340. The air inlet 400 and the air outlet 500 are located at diagonally opposite sides along the longitudinal direction (a direction parallel to the X axis) of the battery module 1.

Meanwhile, an empty space is formed between the bus bar frame 200 and the side cover 320. That is, the empty space in which air for cooling the battery cell 100 flows is formed between one of six outer surfaces of the module housing 300 facing one side and the other side of the battery cell 100 in the longitudinal direction (a direction parallel to the Y axis) and the bus bar frame 200. The empty space is formed at each of both sides of the battery module 1 in the width direction (a direction parallel to the Y axis).

The air inlet 400 is formed at a location corresponding to the empty space formed at one side of the battery module 1 in the width direction (a direction parallel to the Y axis), and the air outlet 500 is formed at a location corresponding to the empty space formed at the other side of the battery module 1 in the width direction.

In the battery module 1, the air introduced therein through the air inlet 400 cools the battery cell 100 while moving from the empty space formed at one side of the battery module 1 in the width direction to the empty space formed at the other side of the battery module 1 in the width direction, and then goes out through the air outlet 500. That is, the battery module 1 corresponds to an air-cooled battery module.

Meanwhile, in the present disclosure, the air inlet 400 may also be used for cooling to serve as a passage through which a heated air risen is discharged, unlike its name. Also, the air outlet 500 may also be used as a passage through which an external air for cooling is introduced, unlike its name. That is, an impeller for forced ventilation may be installed at the air inlet 400 and/or the air outlet 500, and the direction of air circulation may vary depending on a rotation direction of the impeller.

The sprinkler 600 is connected to a supply tube (not shown) that supplies a cooling fluid such as a cooling water, and the sprinkler 600 operates when the temperature inside the battery module 1 or a flow rate of gas inside the battery module 1 increases over a certain level, thereby supplying the cooling fluid into the battery module 1. In other words, if an abnormal situation occurs in the battery cell 100 to cause venting so that a high-temperature gas is discharged, the sprinkler 600 detects the high-temperature gas and operates. If the sprinkler 600 operates in this way, the cooling fluid may be supplied into the battery module 1 to prevent the battery cell 100 from being ignited and/or exploded due to overheating.

A part of the sprinkler 600 is exposed out of the rear cover 340, and the other part of the sprinkler 600 is provided through the rear cover 340 and positioned in an empty space formed between the bus bar frame 200 and the side cover 320. The sprinkler 600 is installed at a side opposite to the air outlet 500 that is formed on one side of the rear cover 340 in a longitudinal direction (a direction parallel to the Y axis).

The sprinkler 600 includes a coupler 610, a sprinkler head 620 and an insulation cover 630. The coupler 610 is positioned at an outer side of the module housing 300 and is connected to the supply tube (not shown) that supplies the cooling fluid. That is, the coupler 610 is made of a metal material and is a component for fastening an external supply tube. The sprinkler head 620 is positioned at an inner side of the module housing 300 and connected to the coupler 610. The insulation cover 630 covers the sprinkler head 620, thereby preventing the sprinkler head 620 from coming into direct contact with the electrode lead 110 of the battery cell 100 and/or the bus bar of the bus bar frame 200 to cause a short circuit.

Figure 4:
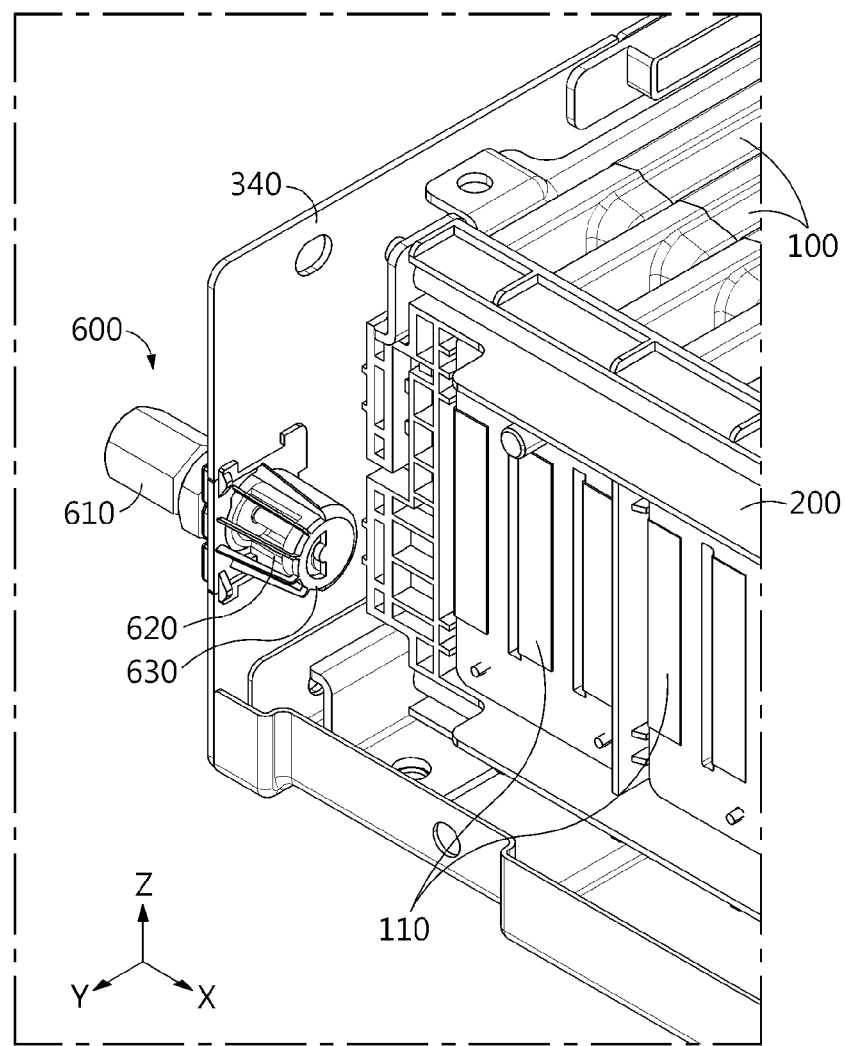
FIGS. 4 and 5 are diagrams showing an inner structure of the battery module according to an embodiment of the present disclosure so that a sprinkler applied in the present disclosure is exhibited.
Figure 5:
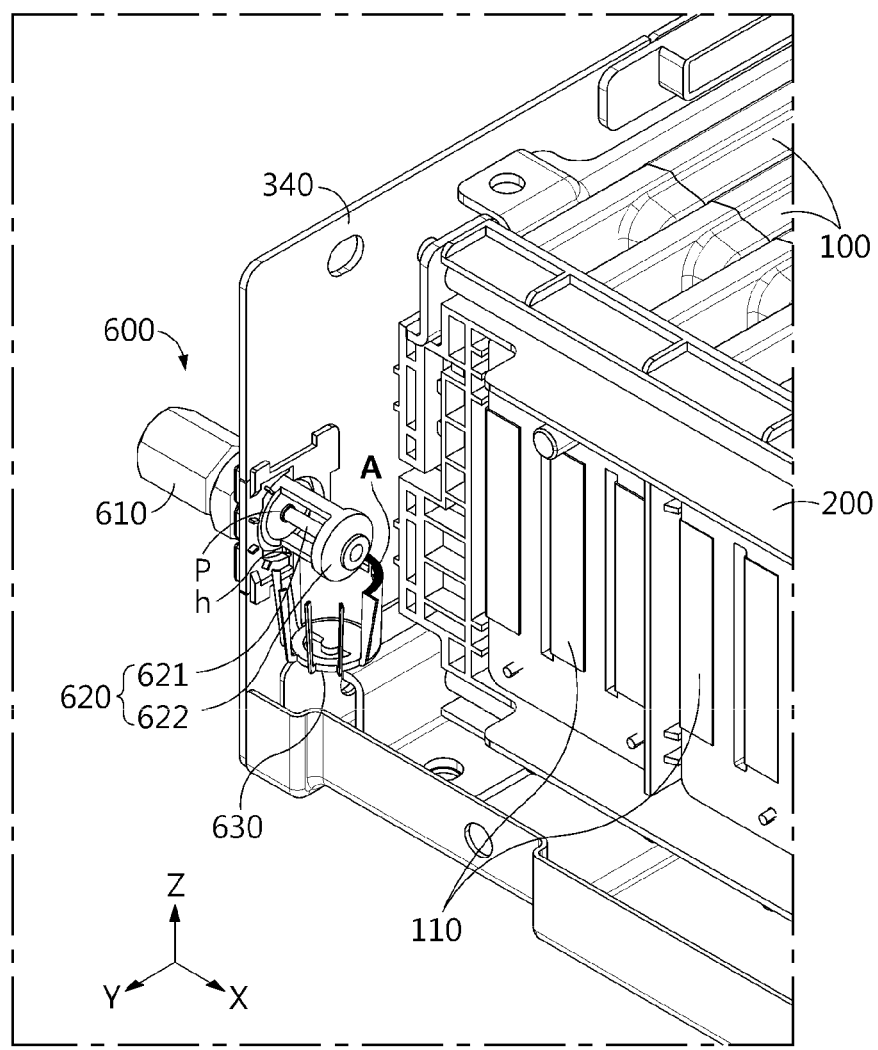

Referring to FIGS. 3 to 5, the sprinkler head 620 includes a glass bulb 621 and a holding bracket 622.

The glass bulb 621 blocks a cooling fluid injection hole P of the coupler 610, and if the temperature inside the battery module 1 or the flow rate of the internal gas heated by the venting gas increases over a reference value, the glass bulb 621 is ruptured to open the cooling fluid injection hole P. The glass bulb 621 contains a liquid that expands as the temperature rises, and the liquid expands if venting occurs in at least some of the battery cells 100 inside the battery module 1 so that the high-temperature venting gas fills in the battery module 1. As the liquid expands, the internal pressure of the glass bulb 621 increases, and at the same time, if the external force of the gas acts together due to the high-pressure venting gas at the outside of the glass bulb 621, the glass bulb 621 is ruptured, so the cooling fluid fills the inside of the module housing 300 through the cooling fluid injection hole P. The holding bracket 622 is made of a metal material and surrounds the glass bulb 621 to fix the glass bulb 621 not to move.

Figure 6:
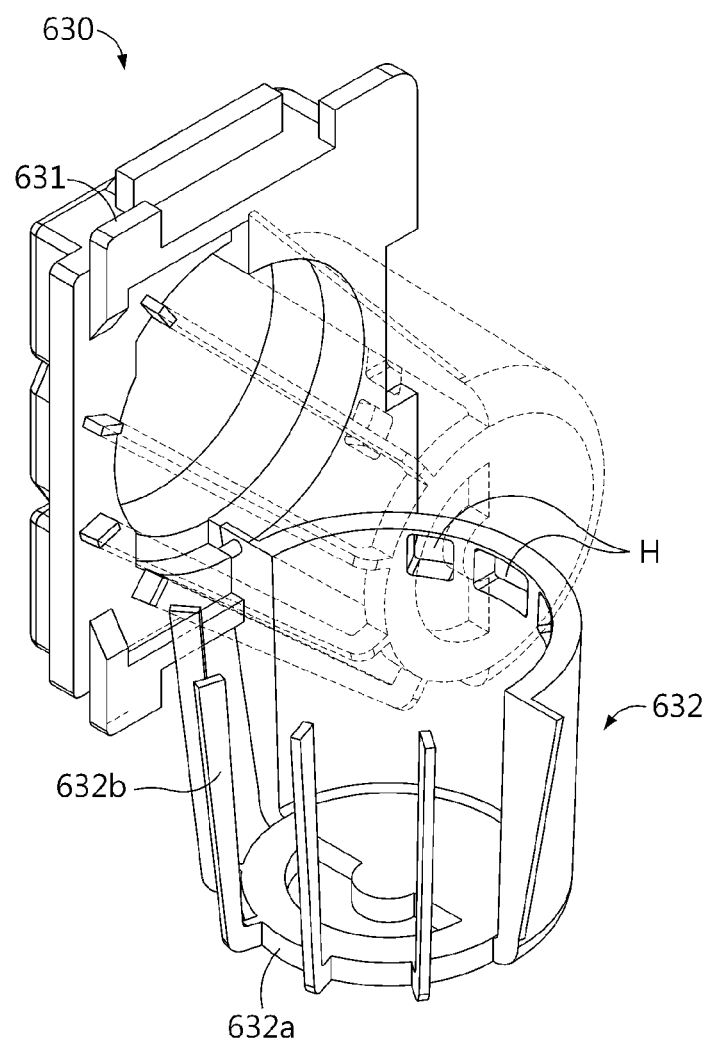
FIG. 6 is a perspective view showing an insulation cover applied in the present disclosure.

Referring to FIGS. 5 and 6, the insulation cover 630 includes a fixing portion 631 and a cover portion 632. The fixing portion 631 is attached to the rear cover 340 by clip fixing. That is, a part of the fixing portion 631 is located at an outer side of the rear cover 340, and the other part of the fixing portion 631 is located at an inner side of the rear cover 340. The cover portion 632 extends in a substantially horizontal direction from the fixing portion 631 and covers the sprinkler head 620.

The cover portion 632 includes a first region 632a facing the cell stack and the bus bar frame 200, and a second region 632b other than the first region. The first region 632a is formed so that a closed area is greater than an opened area, and the second region 632b is formed so that an opened area is greater than a closed area. The cover portion 632 is at least partially opened in order to allow the cooling fluid injected through the cooling fluid injection hole P to be smoothly supplied into the module housing 300.

In addition, the opened area of the first region 632a is smaller than the opened area of the second region 632b in order to minimize the possibility of a short circuit caused by the contact between the holding bracket 622 and the electrode lead 110 and/or the contact between the holding bracket 622 and the bus bar. Meanwhile, the first region 632a may have at least one cover hole H for injecting the cooling fluid.

Meanwhile, the cover portion 632 is coupled to the fixing portion 631 fixed to the module housing 300 in a detachable structure. A bonding layer A is interposed between the fixing portion 631 and the cover portion 632, so that the fixing portion 631 and the cover portion 632 are kept coupled to each other when the battery module 1 is in a normal use state. However, if venting occurs at the battery cell 100 to leak a high-temperature gas so that the temperature inside the module housing 300 rises over a reference temperature, the bonding layer A melts and the bonding force of the bonding layer A is decreased or lost. Accordingly, the cover portion 632 is separated from the fixing portion 631 by injecting the cooling fluid or in advance before the cooling fluid is injected.

Other fixing elements other than the bonding layer A may not be applied to the coupling between the fixing portion 631 and the cover portion 632, or a hinging structure may be additionally applied thereto in addition to the bonding layer A as shown in the figures. If a hinging structure is applied to couple the fixing portion 631 and the cover portion 632 to each other, the cover portion 632 is opened as rotating based on the hinged portion and as the bonding force of the bonding layer A is decreased or lost.

As the cover portion 632 is separated from the fixing portion 631 in this way, the cover portion 632 no longer acts as an element that disturbs the injection of the cooling fluid from the cooling fluid injection hole P, thereby enabling smooth fire extinguishing and cooling.

Figure 7:
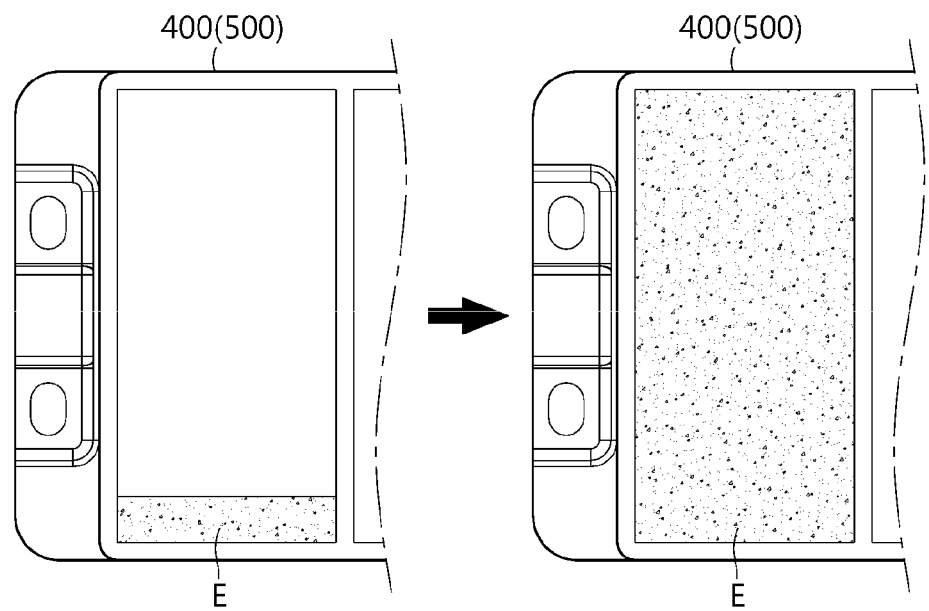
FIG. 7 is a diagram showing a part of a front surface of the battery module according to an embodiment of the present disclosure so that an expansion pad disposed inside the battery module is exhibited.

Referring to FIG. 7, the battery module 1 may further include an expansion pad E configured to at least partially close the air inlet 400 and the air outlet 500 so that the level of the cooling fluid rapidly increases when the cooling fluid is supplied into the battery module 1.

The expansion pad E is attached to an inner surface of the module housing 300 and has a size smaller than the opened area of the air inlet 400 and air outlet 500. When the battery module 1 is in normal use, the expansion pad E preferably has a size less than about 30% of the opened area of the air inlet 400 and air outlet 500 so that air may smoothly flows through the air inlet 400 and air outlet 500. Meanwhile, even though the figures of the present disclosure just depict that the expansion pad E is attached at a bottom portion of the inner surface of the module housing 300, the expansion pad E may also be attached to a top portion or a side portion of the module housing 300.

The expansion pad E is expanded by contacting the cooling fluid introduced into the battery module 1 to close the air inlet 400 and the air outlet 500. The expansion pad E contains a resin that exhibits a very large expansion rate when absorbing moisture, for example a resin that increases in volume by at least about two times or more compared to the initial volume when a sufficient amount of moisture is provided thereto. As a resin used for the expansion pad E, a non-woven fabric in which SAF (super absorbent fiber) and polyester staple fiber are mixed may be mentioned, for example. The SAF is prepared by forming a fiber using SAP (super absorbent polymer).

Meanwhile, when the air inlet 400 and the air outlet 500 are closed due to the expansion of the expansion pad E, this does not necessarily mean that the air inlet 400 and the air outlet 500 are closed so completely that the cooling fluid cannot leak, also includes the case where the opened area of the air inlet 400 and the air outlet 500 is decreased to reduce the amount of leakage.

By applying the expansion pad E, when a thermal runaway phenomenon occurs in at least some battery modules 1 and thus a cooling fluid is introduced into the battery modules 1, the air inlet 400 and the air outlet 500 are closed. If the air inlet 400 and the air outlet 500 are closed as above, the cooling fluid introduced into the battery module 1 does not escape to the outside but stays inside the battery modules 1, thereby quickly resolving the thermal runaway phenomenon occurring in the battery modules 1.

Figure 8:
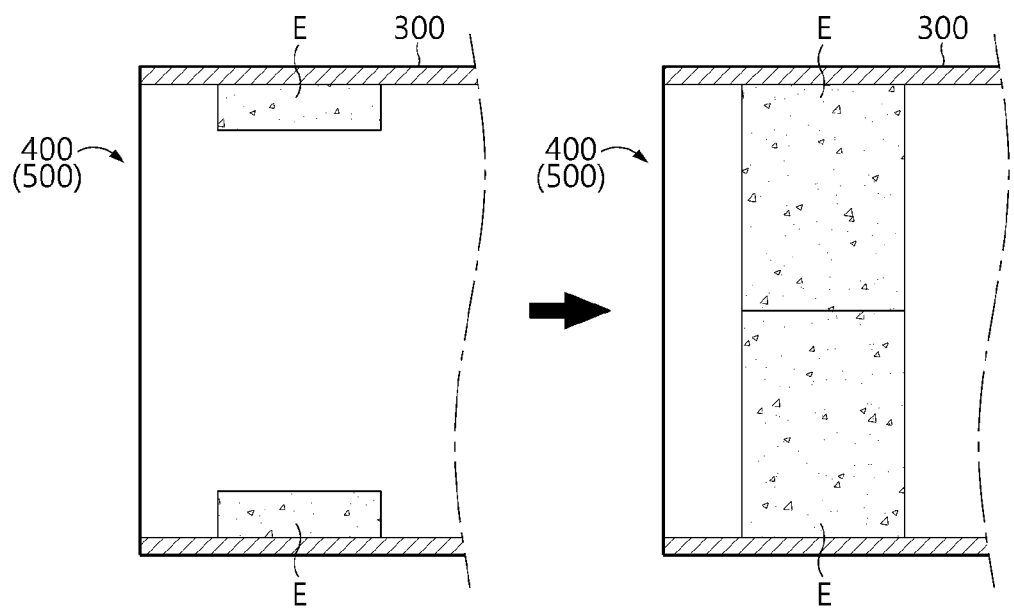
FIGS. 8 to 10 are diagrams showing a part of a section of the battery module according to an embodiment of the present disclosure, observed from a side, so that the expansion pad disposed inside the battery module is exhibited.

Referring to FIG. 8, the expansion pad E may be provided in a pair. In this case, the pair of expansion pads E are attached to an upper portion and a lower portion of the inner surface of the module housing 300, respectively. The pair of expansion pads E are attached at corresponding positions and come into contact with each other to close the air inlet 400 and the air outlet 500 when being expanded.

Figure 9:
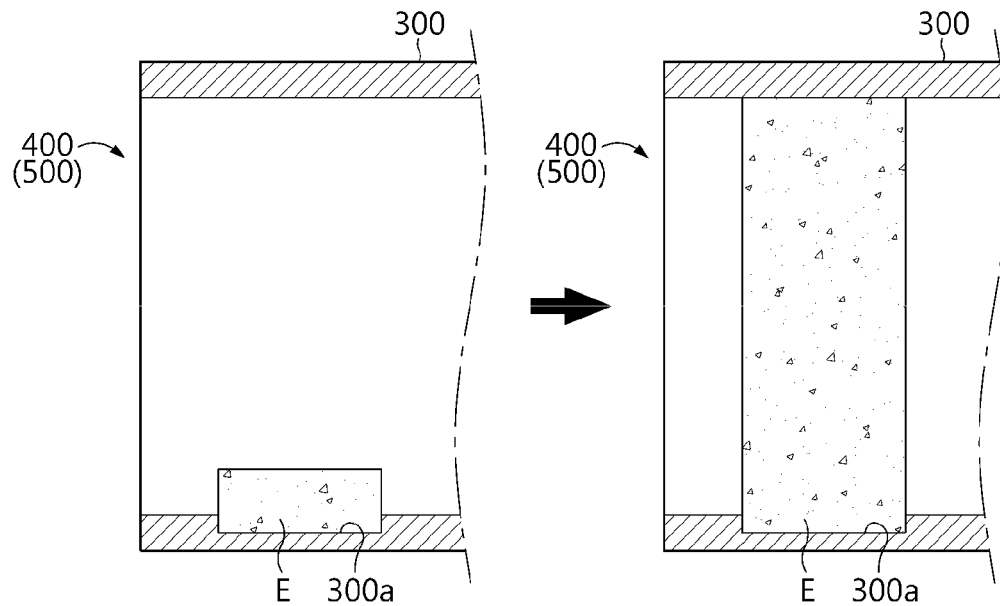

Referring to FIG. 9, the expansion pad E may be fixed by inserting at least a portion of the expansion pad E into an accommodation groove 300a formed to a predetermined depth at the inner surface of the module housing 300.

Figure 10:
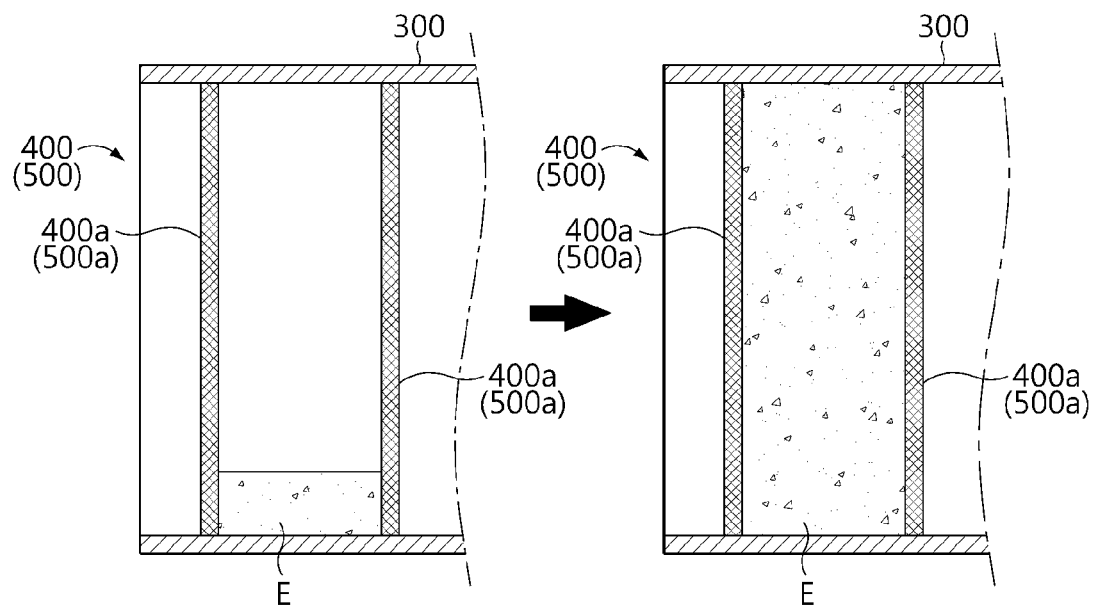

Referring to FIG. 10, the expanding movement of the expansion pad E may be guided by a pair of mesh plates 400a, 500a respectively disposed at both sides thereof when being expanded by absorbing moisture. The mesh plates 400a, 500a are mesh-type plates and have a structure that allows air and the cooling fluid to pass therethrough in a state where the expansion pad E is not expanded.

Meanwhile, an ESS (Energy Storage System) according to an embodiment of the present disclosure includes a plurality of battery modules according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a cell stack including a plurality of battery cells;
   a module housing configured to accommodate the cell stack; and
   a sprinkler provided through the module housing at one side of the cell stack in a stacking direction,
   wherein the sprinkler includes:
   a coupler positioned at an outer side of the module housing and configured to be connected to a supply tube that supplies a cooling fluid;
   a sprinkler head positioned at an inner side of the module housing and connected to the coupler; and
   an insulation cover including a fixing portion fixed to the module housing and a cover portion fixed to the fixing portion by a bonding layer to cover the sprinkler head and configured to be separated from the fixing portion when a temperature in the module housing exceeds a reference temperature as a bonding force of the bonding layer is decreased or lost,
   wherein the fixing portion is attached to an inner side of the module housing and the cover portion extends from the fixing portion and surrounds the sprinkler head, and
   wherein the cover portion has at least one aperture.

2. The battery module according to claim 1, wherein the module housing includes:
   a pair of base covers configured to cover a lower surface and an upper surface of the cell stack, respectively;
   a pair of side covers configured to cover side surfaces of the cell stack;
   a front cover configured to cover a front surface of the cell stack; and
   a rear cover configured to cover a rear surface of the cell stack.

3. The battery module according to claim 2, wherein the battery module comprises a pair of bus bar frames coupled to a first side and a second side of the cell stack in a width direction, respectively.

4. The battery module according to claim 3, wherein the sprinkler is provided through the rear cover and positioned in an empty space formed between a bus bar frame of the pair of bus bar frames and a side cover of the pair of side covers.

5. The battery module according to claim 1, wherein the sprinkler head includes:
   a glass bulb provided to block a cooling fluid injection hole of the coupler and configured to be ruptured to open the cooling fluid injection hole when the temperature inside the battery module increases over the reference temperature or when a flow rate of gas inside the battery module increases over a reference value; and
   a holding bracket configured to fix the glass bulb while surrounding the glass bulb.

6. The battery module according to claim 1, wherein the insulation cover includes a first region facing the cell stack and the bus bar frame and a second region other than the first region, and
wherein the first region is formed such that a closed area is greater than an opened area, and the second region is formed such that an opened area is greater than a closed area.

7. The battery module according to claim 6, wherein the first region has at least one cover hole for injecting the cooling fluid.

8. The battery module according to claim 3, wherein the battery module comprises:
an air inlet formed through the front cover;
an air outlet formed through the rear cover; and
an expansion pad disposed at an inner side of the air inlet and the air outlet and configured to at least partially close the air inlet and the air outlet by expanding when contacting the cooling fluid introduced into the battery module.

9. The battery module according to claim 8, wherein the expansion pad is attached onto an inner surface of the module housing.

10. The battery module according to claim 8, wherein the expansion pad is at least partially inserted into an accommodation groove formed at an inner surface of the module housing.

11. The battery module according to claim 8, wherein the battery module comprises mesh plates respectively disposed at opposite sides of the expansion pad to guide an expanding movement of the expansion pad.

12. The battery module according to claim 8, wherein the air inlet and the air outlet are respectively formed at locations corresponding to an empty space formed between the pair of bus bar frames and the pair of side covers.

13. The battery module according to claim 1, wherein the cover portion is hinged to the fixing portion and is opened by rotating downward of the sprinkler head.

14. An energy storage system (ESS), comprising a plurality of battery modules according to claim 1.

15. The battery module according to claim 1, wherein the cover portion includes a sidewall extending from the fixing portion and an end wall, and
wherein the at least one aperture is in the end wall.

16. A battery module, comprising:
a cell stack including a plurality of battery cells;
a module housing configured to accommodate the cell stack; and
a sprinkler provided through the module housing at one side of the cell stack in a stacking direction,
wherein the sprinkler includes:
a coupler positioned at an outer side of the module housing and configured to be connected to a supply tube that supplies a cooling fluid;
a sprinkler head positioned at an inner side of the module housing and connected to the coupler; and
an insulation cover including a fixing portion fixed to the module housing and a cover portion fixed to the fixing portion by a bonding layer to cover the sprinkler head and configured to be separated from the fixing portion when a temperature in the module housing exceeds a reference temperature as a bonding force of the bonding layer is decreased or lost,
wherein the cover portion has at least one aperture,
wherein the cover portion includes a sidewall extending from the fixing portion and an end wall, and
wherein the at least one aperture is in the sidewall wall.

17. The battery module according to claim 16, wherein the at least one aperture is a plurality of apertures.

18. The battery module according to claim 1, wherein the cover portion is hingedly coupled to the fixing portion.

19. A battery module, comprising:
a cell stack including a plurality of battery cells;
a module housing configured to accommodate the cell stack; and
a sprinkler provided through the module housing at one side of the cell stack in a stacking direction,
wherein the sprinkler includes:
a coupler positioned at an outer side of the module housing and configured to be connected to a supply tube that supplies a cooling fluid;
a sprinkler head positioned at an inner side of the module housing and connected to the coupler; and
an insulation cover including a fixing portion fixed to the module housing and a cover portion fixed to the fixing portion by a bonding layer to cover the sprinkler head and configured to be separated from the fixing portion when a temperature in the module housing exceeds a reference temperature as a bonding force of the bonding layer is decreased or lost,
wherein the cover portion has at least one aperture,
wherein the fixing portion has a first part inside the module housing and a second part outside the module housing, and
wherein the fixing part has a central aperture.

20. The battery module according to claim 1, wherein a width of the fixing portion is greater than a width of the cover portion.

* * * * *